United States Patent
Chang et al.

(10) Patent No.: US 6,800,366 B2
(45) Date of Patent: Oct. 5, 2004

(54) ACRYLIC ADHESIVE COMPOSITIONS FOR POLARIZING FILM AND THE POLARIZER FILM USING THE SAME

(75) Inventors: Suk-Ky Chang, Daejon (KR); In-Seok Hwang, Daejon (KR); In-Cheon Han, Seoul (KR); Hye-Won Sohn, Daejon (KR); Sang-Eon Han, Seoul (KR); Belyaev Sergey, Daejon (KR); Seung-Man Sohn, Daejon (KR); Malimonenko Nikolay, Daejon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 10/203,879

(22) PCT Filed: Dec. 21, 2001

(86) PCT No.: PCT/KR01/02235

§ 371 (c)(1),
(2), (4) Date: Aug. 15, 2002

(87) PCT Pub. No.: WO02/50209

PCT Pub. Date: Jun. 27, 2002

(65) Prior Publication Data

US 2003/0054166 A1 Mar. 20, 2003

(30) Foreign Application Priority Data

Dec. 21, 2000 (KR) .......................... 2000-79610
Aug. 31, 2001 (KR) .......................... 2001-53399

(51) Int. Cl.$^7$ ............................................. B32B 27/30
(52) U.S. Cl. ............................. 428/355 AC; 428/1.31; 524/190; 524/205; 524/208; 524/246; 524/293; 524/369; 524/481; 524/484; 524/485; 524/486; 353/20

(58) Field of Search .......................... 428/355 AC, 1.31; 524/190, 205, 208, 246, 293, 369, 481, 484, 485, 486, 81, 155, 167, 170, 172, 186, 189, 197, 210, 700, 707, 715, 722, 736, 741, 743; 353/20

(56) References Cited

U.S. PATENT DOCUMENTS 4,560,723 A * 12/1985 Millet et al. ................. 524/486
5,498,670 A * 3/1996 Aoyama et al. ............ 525/217

FOREIGN PATENT DOCUMENTS

| JP | 5-117324 A | 5/1993 |
| JP | 7-120732 A | 5/1995 |
| JP | 7-228850 A | 8/1995 |
| JP | 8-302325 A | 11/1996 |
| JP | 10-279907 | 10/1998 |

OTHER PUBLICATIONS

Machine Translation, JP 07–228850, Nomura et al., Aug. 29, 1995.*
Machine Translation, JP 10–279907, Nomura et al., Oct. 20, 1998.*

* cited by examiner

*Primary Examiner*—David J. Buttner
*Assistant Examiner*—Christopher Keehan
(74) *Attorney, Agent, or Firm*—Birch, Stewart, Kolasch & Birch, LLP

(57) ABSTRACT

The present invention provides an acrylic pressure sensitive adhesive composition having an element with a positive stress optical coefficient for a polarizing film and a polarizing film using the same.

11 Claims, No Drawings

ACRYLIC ADHESIVE COMPOSITIONS FOR POLARIZING FILM AND THE POLARIZER FILM USING THE SAME

CROSS REFERENCE TO RELATED APPLICATION

This application is the national phase under 35 U.S.C. §371 of PCT International Application No. PCT/KR01/02235 which has an International filing date of Dec. 21, 2001, which designated the United States of America.

This application is based on applications Nos. 2000-79610 and 2001-53399 filed in the Korean Industrial Property Office on Dec. 21, 2000 and on Aug. 31, 2001, the contents of which are incorporated hereinto by reference.

BACKGROUND OF THE INVENTION (a) Field of the Invention

The present invention relates to acrylic pressure-sensitive adhesive compositions for a polarizing film, and the polarizing film using the same.

(b) Description of the Related Art

A liquid crystal display generally includes a liquid crystal cell and polarizers, and the liquid crystal cell and polarizers are assembled to produce a final device by using suitable pressure-sensitive adhesive (PSA) layers. In addition, the liquid crystal display may include phase retardation films, compensation films for wide viewing angle performance, and films for brightness enhancement in order to improve the function of the liquid crystal display.

Two main components of the liquid crystal display include 1) a liquid crystal layer aligned properly between two glass plates, in which a color filter and a transparent electrode layer are constructed inside, and 2) polarizers, if necessary including phase retardation films, and additional functional films laminated on the glass plates by suitable adhesive or PSA layers. The polarizers include polarizing elements such as an iodine-based compound or a dichloric polarizing material aligned in a constant direction by stretching the molecular chains of polyvinyl alcohol (PVA)-based film, or a structure of polyene prepared by hydrolysis of PVA film or by a dehydrochloric acid reaction of polyvinyl chloride (PVC) film, and at least one side of the polarizing element is protected by a protecting film such as triacetyl cellulose (TAC) film. Additionally, the polarizer may include retardations film that have an anisotropic molecular alignment, and/or functional films for wide-viewing-angle compensation and brightness enhancement such as an optically designed liquid crystal film.

The aforementioned films have different physical, chemical, and optical characteristics, since the films are prepared from materials that have different molecular structures and compositions. When a liquid crystal display is used for a long time, the composing materials having different molecular structures and composition from each other become aged, and the molecular structure of the materials are changed. For example, 1) the difference in linear expansion coefficients among materials according to temperature change results in a continuous stress generation in the composing layers, and 2) materials having a preexisting molecular alignment are deformed by stress relaxation, so optical properties of polarizers change resulting in a severe light leakage from the liquid crystal display device.

In order to prevent light leakage from the polarizer, the stress resulting from the polarizer shrinkage should be first eliminated, but it is difficult to remove the stress build-up among the materials, since the polarizer and the PSA on the glass plate have different characteristics of dimensional stability in terms of shrinking and expansion behavior in high temperature and humidity conditions.

As an attempt for stress relaxation between a polarizer and a PSA layer on a glass plate, U.S. Pat. No. 5,795,650 discloses that an adhesive layer comprising plasticizer components is effective in relaxing a stress due to a polarizer shrinkage. However, the light leakage is not completely eliminated and since the plasticizer components may deteriorate the adhesion property of the PSA, one may have durability problems, such as bubbles and edge lifting problems. In addition, when a polarizer product is cut by a knife, the polarizer may be contaminated by the plasticizer component due to the increase in softness of the adhesive composition.

As another attempt, Japanese Patent Hei 10-279907 discloses that a mixture of an acryl-based polymer having a high molecular weight and an acryl-based polymer having a molecular weight of less than 30,000 relieves the stress in order to prevent the light leakage from the device. However, the light leakage is not completely eliminated, and the adhesion reliability is suspect due to the possibility of generation of large bubbles and edge lifting. Also, the polarizer may be contaminated by a cutting operation of the polarizer, the same as in the case of U.S. Pat. No. 5,795,650.

In general, PSAs include rubber-based, acryl-based, and silicon-based materials, and the acryl-based PSA among them has been extensively used due to their high optical performance and adhesion quality. The acryl-based adhesives exhibit good adhesion characteristics when they are lightly pressurized at room temperature, since the acryl-based adhesives can be designed to have proper chain mobility of molecules by the light pressure. The adhesion force of acrylic PSAs ranges generally from 100 to 3000 gm/in. Molecular characteristics of acryl-based PSA materials, such as molecular weight and distribution, cross-linking density, and composition, mainly influence the durability of PSAs, which may be controlled by the high adhesive strength and cohesive strength.

However, generally, using a PSA with the capacity for stress relaxation to relieve the stress build-up in a polarizer unit shows insufficient durability in resisting the formation and growth of bubbles and edge lifting in high temperature and high humidity conditions which are critical to the performance of a display panel. In addition, when a polarizer product comprising an adhesive sheet having high mobility is cut precisely, the adhesive is easily elongated out of the product, resulting in contamination of the product.

Therefore, the improvement in light leakage of PSAs must be achieved with little change in the main requirements of polarizer products such as durability and cuttability.

SUMMARY OF THE INVENTION

It is an object of the present invention to provide an acrylic PSA composition that greatly improves light leakage from the polarizer-unit with little change in major requirements of polarizer products such as durability and cuttability.

It is another object to provide a polarizer film using the same.

In order to achieve these objects, the present invention provides an acryl-based PSA composition comprising a component having a positive stress optical coefficient, and a polarizer film using the same.

DETAILED DESCRIPTION OF THE INVENTION

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The present invention provides an acryl-based PSA composition comprising a component having a positive stress optical coefficient, and a polarizer film using the same.

When a liquid crystal display is used for a long time, a complicated optical distortion occurs by the change in optical properties of composing films mainly due to the shrinking stress of a polarizer unit, which is called the unexpected birefringence phenomenon or the light leakage problem. In order to prevent the birefringence problems with the films, the inventors of the present invention investigated various components of a liquid crystal display such as the polarizer unit, the liquid display panel, and the PSA layer. As a result, it was discovered that the light leakage is resulted from the birefringence that occurs by stress build-up in composing films when materials having different dimensional stability are bonded together. In this invention, in order to provide a solution for the light leakage problem, a PSA composition comprising an optically active component that is capable of automatically compensating the birefringence by the same stress field of the system was suggested.

Since the PSA layer needs a strong cohesive force at high temperatures, properly cross-linked viscoelastic materials may be used so that the adhesive layer has excellent durability. The molecular structure of cross-linked PSAs is usually partially cross-linked, and when the partially cross-linked molecules are stressed, molecular chains of the cross-linked part are stressed in a specific direction, since the stress of the cross-linked part cannot be sufficiently relieved. The elastic characteristics of PSAs are similar to those of rubber or an elastomer, and the main chains of the PSA are aligned in a direction of applied stress. Therefore, when a material is stressed, it shows positive or negative birefringence, and the polarizer unit under shrinking stress can be characterized by positive stress birefringence in the triacetyl cellulose (TAC) protection film layer and negative stress birefringence in the cross-linked linear molecules of most acrylic PSA compositions.

When the PSA of the present invention is not stressed, the PSA molecules do not change the optical properties of the liquid crystal display, because the PSA remains isotropic, and only when the PSA is stressed due to polarizer shrinkage does it exhibits the birefringence compensation to relieve the display system from the light leakage, that is, the present invention can be distinguished from other inventions by the use of a light compensation technique through the understanding of the stress field of the system.

In addition, the PSA of the present invention and a polarizer film using the same can be prepared in a similar way to the procedure of preparing the conventional PSA layer.

The acryl-based PSA composition of the present invention comprises a component having a positive stress optical coefficient.

The PSA composition of the present invention comprises a) 100 weight parts of an acrylic copolymer forming a cross-linked structure and b) a component having a positive stress optical coefficient and ranging from 0.01 to 30 weight parts based on a). The component having a positive stress optical coefficient can be used by copolymerization or blending with acrylic copolymer a). There are many kinds of materials that can be used as component b), but a component having an asymmetric molecular structure in an axial direction is preferred.

In addition to that, it is obvious to use component b) in a small amount so that PSA efficiency remains unchanged. For that purpose, a component having an asymmetric structure in an axial direction is used. The composition of the present invention can be prepared by copolymerization of PSA resin with the component having a positive stress optical coefficient in a suitable ratio in order to form a structure having a side chain branched from a main chain, or by a conventional blending technique, and the prepared composition has similar characteristics to those of the conventional PSA which is used in adhesive-coating and lamination.

In the present invention, the component b) may include one compound or mixtures of two or more selected from the group consisting of compounds having an asymmetric molecular structure and a positive stress optical coefficient in an axial direction. The compounds used in this invention having a positive stress optical coefficient are miscible to the acryl-based PSA in a wide range of composition, and they minimize the change in glass transition temperature of the PSA. Thus, the component b) may be used in a suitable amount after considering the miscibility with PSA base composition.

The component b) may include one compound, or mixtures of two or more, and it exhibits a positive stress optical coefficient when the components are dispersed uniformly in the PSA. In particular, when a main chain of an adhesive is aligned in a constant direction by the applied stress, the component b) is also aligned in the direction of the main chain, so that the birefringence of the PSA layer is changed. When the composite structure of laminated films exhibits a birefringence due to the stress, the component b) may compensate the resulting birefringence of each film sheet. In order to compensate the birefringence of the laminated films, when the component b) is used in a small amount, high birefringence of the component b) is preferred. When the component has a rigid molecular structure and asymmetry in the axial direction, the component is capable of aligning effectively according to the applied stress resulting in the change of PSA birefringence. That is, when molecules of the component have a rigid structure and asymmetry in an axial direction, the molecules are easily aligned in a direction of a main chain of the PSA, resulting in positive birefringence. By considering this individual optical activity of each layer, the complicated birefringence from the laminated polarizer unit comprising protecting film sheets and the PSA layer, which are under specific stress fields, can be controlled effectively.

In addition, when the component has a low molecular weight, elasticity and resilience of the PSA increase, so the molecular weight of the component is preferably less than 2000.

The component having a positive stress optical coefficient may include aromatic compounds or alicyclic compounds, wherein the aromatic compounds are classified as aromatic crystalline compounds and aromatic liquid crystalline compounds such as cholesteric and smectic compounds, according to whether the substitute of an aromatic ring exists or according to the kinds of aromatic compounds.

A representative example of the component b) having a positive stress optical coefficient is preferably an aromatic compound as represented by Formula 1:

Chemical Formula 1

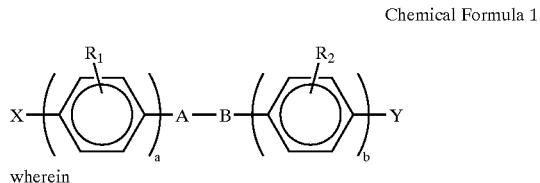

wherein

X and Y, and $R_1$ and $R_2$ are substituted groups selected from $C_1$~$C_{20}$ alkyl, $C_1$~$C_{20}$ alkoxy, $C_1$~$C_{20}$ aryl, hydrogen, cyano, chloride, bromide, hydroxy, dimethyl amine, or cumyl;

A—B is —CH=N—, —N=N—, —N=N(O)—, —COO—, —CH$_2$O—, —C(R$_1$)CO—, —COO—CH$_2$—, —C=C—, —C≡C—, —S—, —SO$_2$—, -φ(R$_1$)—, —CH=N-φ(R$_1$)—N=CH—, —C=C-φ(R$_1$)—N=C—, —C=C-φ(R$_1$)—C=C—, —C=C-φ(R$_1$)-Φ(R$_2$)—C=C—, —C=N-φ(R$_1$)-φ(R$_2$)—N=C—, —C=N-φ(R$_1$)-φ(R$_2$)—C=C— that act as cores, or a core of naphthalene or anthracene, or A–B can be eliminated for direct connection, wherein when a is an integer of 1 to 3, b is an integer of 0 to 3, and when a is 0, b is an integer of 1 to 3.

The aromatic compounds include biphenyl, trans-stilbene, azobenzene, p-terphenyl, m-terphenyl, cumylphenylbenzoate, diphenylacetylene, 4-ethylbiphenyl, 4'-pentyl-4-biphenyl carbonitrile, 4-biphenyl carbonitrile, 4'-pentylbiphenyl, 4'-penthoxy-4-biphenyl carbonitrile, 4'-hexyl-4-biphenylcarbonitrile, 4'-octyl-4-biphenylcarbonitrile, trans-4-octyl-4'-ethoxystilbene, naphthalene, anthracene, 4'-methoxybenzylideneaminostilbene, 4'-methoxybenzylideneaminoazobenzene, and a mixture thereof, and the aromatic compounds are not limited to the aforementioned.

In addition, aromatic compounds having a positive stress optical coefficient includes crystalline material such as trans-stilbene, terphenyl, diphenyl acetylene, or biphenyl, when the aromatic compounds do not have substituents of X or Y, or they are small in size. When the X or Y derivatives have a suitable combination of polar-nonpolar or chiral groups, the material having the X derivatives or Y derivatives are smectic or cholesteric liquid crystalline compounds, and exemplary aromatic compounds and alicyclic compounds are described. (Polymer Liquid Crystals, A. C. Cifferri, W. R. Krigbaum, R. B. Meyer, Academic Press (1982)).

The selection of component b) does not depend on liquid crystallinity or crystallinity, but on a stress optical coefficient, and it is preferable that the component b) has a positive stress optical coefficient. Since a molecular structure of the component b) and miscibility of the composition is critical to the optical properties and the PSA performance, the component b) should have a positive stress optical coefficient such as with aromatic compounds and alicyclic compounds.

The amount of b) can be selected variously, depending on the characteristics such as birefringence and adhesion properties. In order to maintain adhesion characteristics, the content of b) preferably ranges from 0.001 to 40 parts by weight, more preferably from 0.01 to 30 parts by weight, and most preferably from 0.05 to 25 parts by weight. The b) may be blended with a PSA by a conventional way. In addition, the b) can be incorporated into the PSA as a multi-layer PSA structure.

The molecular weight of the acryl-based copolymer ranges from 200,000 to 2,000,000, and it preferably ranges from 600,000 to 1,500,000, and it comprises i) 75 to 99.89 wt % of a (meth)acrylic acid ester monomer comprising alkyl ester of $C_1$ to $C_{12}$, preferably an alkyl ester of $C_2$ to $C_8$, and ii) a functional monomer which is reactive with a cross-linking agent. The content of the (meth)acrylic acid ester monomer preferably ranges from 75 to 99.89 wt %, and more preferably from 80 to 98 wt %.

When the alkyl(meth)acrylate has an alkyl group having a long chain, the adhesive has a low cohesive force, so an alkyl group of $C_2$ to $C_8$ is preferably used in order to prevent lowering of the cohesive force. When the alkyl(meth)acrylate is excessive, its cohesive force lowers. When the content of the alkyl(meth)acrylate is below 75 wt %, the adhesive force of the adhesive decreases, and its production cost may be increased.

The acryl-based copolymer may be prepared by solution polymerization, photopolymerization, bulk polymerization, suspension polymerization, or emulsion polymerization. In particular, the acryl-based polymer is preferably prepared by solution polymerization at a temperature ranging from 50 to 140° C., and it is preferable that the initiator is added when the monomers are uniformly mixed. The PSA needs proper viscoelasticity, and it depends on the molecular weight and the molecular weight distribution, and the branching structure of the polymer chains. It is found that the viscoelasticity is mainly affected by the molecular weight and molecular weight distribution of the polymer chains. The molecular weight of the acryl-based copolymer preferably ranges from 200,000 to 2,000,000, and more preferably from 600,000 to 1,500,000, and it may be prepared by conventional radical copolymerization.

The (meth)acrylic acid monomers comprises butyl(meth)acrylate, 2-ethylhexyl(meth)acrylate, ethyl(meth)acrylate, methyl(meth)acrylate, n-propyl(meth)acrylate, isopropyl (meth) acrylate, t-butyl (meth)acrylate, pentyl(meth)acrylate, n-octyl(meth)acrylate, isononyl(meth)acrylate and a mixture thereof, but it is not limited to the aforementioned. In addition, during the copolymerization of the acryl-based copolymer, monomers may be used in order to control the glass transition temperature of a PSA, and to give the PSA other useful properties. The monomers can include acrylonitrile, glycidyl(meth)acrylate, vinyl acetate, styrene, and a mixture thereof. The monomers may further include various acryl-based monomers that are not mentioned here and vinyl-based monomers for the specific purpose.

The functional monomers of ii) may include 0.1 to 20 wt % of unsaturated α, β carboxylic monomers, or 0.01 to 5 wt % of a monomer having a hydroxy group, and a mixture thereof. The concentration of the unsaturated α, β carboxylic monomer preferably ranges from 0.5 to 15 wt %. The functional monomer of ii) gives a PSA of the present invention adhesion strength or cohesive force. When the content of the unsaturated α, β carboxylic monomer is below 0.1 wt %, the effect of improvement in adhesion strength may be decreased, and when it is greater than 20 wt %, the adhesion strength may be deteriorated due to a decrease in mobility resulting from increasing its cohesive force. Unsaturated α, β carboxylic monomers include acrylic acid, methacrylic acid, acrylic acid dimer, itaconic acid, maleic acid, maleic anhydride, and a mixture thereof, but they are not limited to the aforementioned.

The functional monomers having hydroxy groups that are reacted with a cross-linking agent provides the PSA with cohesive force due to a chemical bond which is sufficient to bear a cohesive failure of the PSA at high temperature, and the amount of the functional monomer having a hydroxy group preferably ranges from 0.01 to 5 wt %. When the amount of the functional monomers having hydroxy groups is below 0.01 wt %, a cohesive failure of the PSA at high temperature occurs, and when it is greater than 5 wt %, the softness may be deteriorated at high temperature. The functional monomers include 2-hydroxyethyl(meth)acrylate, 2-hydroxypropyl(meth)acrylate, 2-hydroxyethyleneglycol (meth)acrylate, 2-hydroxypropyleneglycol(meth)acrylate, and a mixture thereof, but they are not limited to the aforementioned. The vinyl-based monomer having a hydroxy group may also be used in the present invention as long as the monomers are suitable for the present invention. Each of the aforementioned monomers may be used, and a mixture thereof may also be used.

The unsaturated α, β carboxylic monomer and functional monomers having a hydroxyl group provide the PSA of the present invention with an adhesive and cohesive force, and the formation of cross-linked structures, but if the PSA already has a cross-linked structure or exhibits high cohesive strength, the unsaturated α, β carboxylic monomers and the functional monomers having hydroxyl groups do not need to be used. However, by using the functional monomers having hydroxyl groups one may obtain a PSA that shows better controllability of durability and light leaking problems.

The unsaturated α, β carboxylic monomers and the functional monomers having hydroxy groups can be used or replaced by other functional monomers as long as the objects of the present invention are met. For example, the PSA can be cross-linked by reacting the multi-functional epoxy-based compound with the functional group of a carboxylic acid, reacting the multi-functional aziridine with a functional group of carboxylic acid, or by using a UV curing agent. In addition, in order to provide the PSA of the present invention with the adhesion force, a polar material may be used to replace the unsaturated α, β carboxylic monomer. The multi-functional compounds can be used to produce the cross-linked structure and the adhesion reliability of the PSA also increases.

The acryl-based PSA composition for a polarizer comprises a) 100 parts by weight of an acryl-based copolymer which forms a cross-linked structure, b) 0.01 to 30 parts by weight of a component having a positive stress optical coefficient based on 100 parts by weight of the acryl-based copolymer a), and c) 0.01 to 10 parts by weight of a multi-functional cross-linking compound based on 100 parts by weight of the acryl-based copolymer.

The multi-functional cross-linking compound of c) enables the polymer main chains and side chains to orient, and when it is used for a viscoelastic PSA, it helps to orient main chains and side chains.

The multi-functional cross-linking compound includes isocyanate cross-linking agents, epoxy-based cross-linking agents, aziridine-based cross-linking agents, and metal chelate-based cross-liking agents. The isocyanate crosslinking agent includes tolylene diisocyanate, diphenylmethanediisocyanate, hexamethylenediisocyanate, and their adducts with trimethylolpropane, but it is not limited to the aforementioned. The c) may effectively provide the crosslinked structure that is necessary in this invention, and it may be selected from a combination of itself and functional groups having hydroxy groups.

During the mixing step, the cross-linking reaction of c) with functional groups having hydroxyl groups does not occur severely and it may be coated uniformly. After the coating of the PSA layer, drying, and the aging step, the resulting PSA layer having elasticity and strong cohesive strength due to its cross-linked structure is formed. The strong cohesive force of the PSA enhances the durability and cuttability. The PSA may also be cross-linked by using open techniques of UV or EB. Therefore, the contribution of b) and c) gives rise to the improvement in the light leaking problem without sacrificing the durability at high temperature and high humidity conditions and cuttability, in the PSA of the present invention.

The cross-linking density of the PSA composition preferably ranges from 1 to 95 wt %, more preferably from 30 to 90 wt %, and most preferably from 40 to 80 wt %. The cross-linking density is evaluated by measuring the amount of the cross-linked parts using the conventional method of measuring gel content of acryl-based PSAs.

The tackifiers may be further added in order to control the PSA properties, and the amount of the tackifiers ranges from 1 to 100 parts by weight. When the amount of the tackifiers is excessive, the cohesive force of the PSA may decrease. The tackifiers include (hydrogenated) hydrocarbon-based resin, (hydrogenated) rosin-based resin, (hydrogenated) rosin ester-based resin, (hydrogenated) terpene resin, (hydrogenated) terpene phenolic resin, polymerized rosin resin, and polymerized rosin ester resin. The tackifiers may also include a mixture thereof. In addition, the PSA composition of the present invention may comprise mixtures of epoxy resin and cross-linking agents, silane-based coupling agents, plasticizers, antioxidants, UV stabilizers, reinforcements, fillers, and colorants depending on the final use of the present invention.

The PSA composition can be prepared by various methods such as random copolymerization, graft copolymerization, and block copolymerization. The PSA composition can also be prepared by photopolymerization, wherein a suitable and conventional photo-initiator is used.

The PSA composition of the present invention is not limited to the aforementioned uses, and the concept of the present invention is applicable to silicon-based, rubber-based, urethane-based, polyester-based, and epoxy-based PSA and adhesives, heat-activated PSAs, and hot-melt adhesives, regardless of the type of materials. That is, the described composition is applicable to all types of adhesive laminations that are used as optical materials providing the birefringence compensation for the light leakage problem.

The present invention provides a polarizer comprising the aforementioned PSA composition.

The polarizer of the present invention comprises the PSA layer(s) that is formed on either surface of the polarizer film. Conventional components can be used for a polarizer film and a polarizer element that is used in the present invention. For example, the conventional polarizer film includes a film prepared by adding iodine or dichloric dye to polyvinylalcohol-based films such as polyvinylalcohol, polyvinylformal, polyvinylacetal, ethylene, and a vinyl acetate copolymer, stretching thereof, and laminating the film with protecting films such as triacetyl cellulose, polycarbonate film, and polyethersulfone film.

The PSA layer is formed on the polarizer film by coating the PSA solution on the surface of a polarizer film using a bar-coater, and drying it; or by coating the PSA solution on the surface of strippable material, drying it in order to form a PSA layer, transferring the PSA layer to the surface of the polarizer, and aging it.

It is preferable that the protection film of the present invention has a positive stress optical coefficient, and exemplary protection film includes triacetyl cellulose. The kinds of protection film and the preparation method of the protection film are not limited to the aforementioned, however, and any kind of protection film and preparation method that is known can be used.

The PSA layer of the present invention can be formed on one side or both sides of the polarizer film. In addition, the polarizer of the present invention may be coated with a protecting layer, a reflection layer, an anti-glare layer, a retardation plate, a film for a wide view angle, or films for brightness enhancement.

The following Examples and Comparative Examples illustrate the present invention in further detail, but the present invention is not limited by these Examples. The unit of content that is mentioned in this application is weight percent, if it is not stated otherwise.

EXAMPLE

The abbreviations of the materials in the present invention are as follows:
n-BA: butylacrylate
MA: methylacrylate
AA: acrylic acid
2-HEMA: hydroxyethyl(meth)acrylate
AIBN: azobisisobutyronitrile
EA: ethylacetate
LC-1: liquid crystal-1

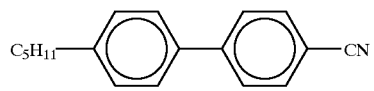

LC-2: liquid crystal-2

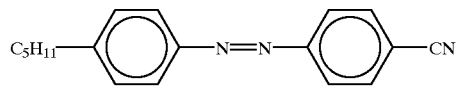

C-1: diphenylacetylene (tolan)
C-2: terphenyl

Example 1

Preparation of Copolymers

A mixture of 94.5 parts by weight of n-butyl acrylate (BA), 5 parts by weight of acrylic acid (AA), and 0.5 parts by weight of 2-hydroxyethyl(meth)acrylate (2-HEMA) was placed in a 1000 cc reactor equipped with a temperature controller and a condenser with nitrogen gas reflux. 100 parts by weight of ethylacetate (EAc) was added thereinto. The reactor was purged with nitrogen gas for 20 minutes in order to remove oxygen from the reactor, 0.03 parts by weight of 50% azobisisobutyronitrile (AIBN) which was diluted with ethyl acetate was added, they were reacted together for 10 hours at 65° C., and thereby an acrylic polymer (PA-1) was obtained. The molecular weight of the acrylic polymer was measured by using polystyrene standard samples. According to the monomer compositions in Table 1, polymers of molecular weight ranging from 600,000 to 1,000,000 were obtained.

Preparation of PSA Layers

The acryl-based polymer solution (about 50% solid content) was mixed with 3 parts by weight of LC-1, based on 100 parts by weight of the acryl-based polymer solution. Then, 1.2 parts by weight of tolylendiisocyanate adduct (TDI-1), which was diluted to 10% with ethyl acetate, was added thereto with high speed mixing, and it was diluted to a desired concentration for good quality of coating on a release film, and dried in order to prepare a uniform PSA layer with a thickness of 30 μm.

Lamination Process

The adhesive layer was laminated on a iodine-based polarizer with a thickness of 185 μm, with a laminator, so that a polarizer with a PSA layer was prepared. The polarizer was cut into a desired size in order to test its properties. The properties of the polarizer were evaluated by the following tests.

<Tests of Polarizer Properties>

Durability

Two polarizers of 90 mm×170 mm were attached on both sides of a glass of 110 mm×190 mm×0.7 mm using a laminator at about 5 kg/cm² pressure. The optical axis of each polarizer was 45° and they crossed each other to obtain a dark state. The lamination step was carried out in a clean room in order to prevent the panel from taking up bubbles or contamination. The test samples were put in a humidity chamber of 60° C., 90% RH for 1000 hours in order to examine the formation of bubbles or edge lifting by the wet-heat condition. Also the heat-resistance of the samples was tested in an oven at 80° C. for 1000 hours in the same way as the wet-heat test. The test samples were further conditioned for 24 hours at room temperature before the evaluation was performed. The durability was evaluated as follows:

0: No bubbles and no edge lifting was observed.
Δ: a few small bubbles and a little edge lifting were observed.
X: a large amount of bubbles and edge lifting were observed.

Light Leakage

The light leakage of the samples that were prepared as above (crossed polarizer state) was evaluated by observing them using a backlight system in a dark room. The polarizers of 90 mm×170 mm were attached on the glass surfaces with a size of 110 mm×190 mm×0.7 mm for method "A", and the polarizers of 130 mm×240 mm were attached on the glass with a size of 150 mm×260 mm×0.7 mm for method "B" in order to measure uniformity of their light transmittance.

0: No light leaking was observed by the naked eye.
Δ: a little non-uniform light transmission was observed.
X: a severe light leaking from the edge of polarizers was observed.

Cuttability

The polarizer comprising the PSA was cut with a Thomson cutter. The cross section of the cut polarizer was observed and evaluated as follows:

0: The degree of adhesive pull out after cutting was less than 0.2 mm.
Δ: The degree of adhesive pull out from the edge was from 0.2 to 0.5 mm.
X: The degree of adhesive pull out from the edge was greater than 0.5 mm.

Examples 2 to 5

The procedure was performed in the same way as in Example 1, except that the polymer composition was changed according to Table 2 in order to observe results as the content ratio of LC-1 and LC-2 was varied.

Examples 6 to 8

The procedure was performed in the same way as in Example 1, except that the polymer composition was changed according to Table 3 in order to observe results as the content ratio of LC-1 and LC-2 was varied.

Examples 9 to 10

The procedure was performed in the same way as in Example 1, except that the polymer composition was changed according to Table 3 in order to observe results as the content ratio of C-1 and C-2 was varied.

Comparative Examples 1 and 2

The polarizer was prepared in the same way as in Example 1, except that it was prepared without using LC-1 and LC-2 in order to observe the results according to composition of polymer, cross-linking structure.

Comparative Example 3

The polarizer was prepared in the same way as in Example 1, except that it was prepared with a change of the polymer composition and the amount of C-1.

TABLE 1

| Composition | PA-1 | PA-2 | PA-3 | PA-4 | PA-5 |
|---|---|---|---|---|---|
| BA | 94.5 | 94.3 | 86.5 | 99.5 | 95.0 |
| MA |  |  | 10 |  |  |
| AA | 50 | 5.0 | 3.0 |  | — |
| 2-HEMA | 0.5 | 0.7 | 0.5 | 0.5 | — |
| AIBN | 0.03 | 0.03 | 0.03 | 0.05 | 0.03 |
| EAC | 100 | 100 | 100 | 100 | 100 |

TABLE 2

| Composition and Properties | Example 1 | Example 2 | Example 3 | Example 4 | Example 5 | Comparative Example 1 | Comparative Example 2 |
|---|---|---|---|---|---|---|---|
| PA-1 | 100 | 100 | — | — | 100 | 100 | — |
| PA-2 |  |  | 100 |  |  |  | — |
| PA-3 |  |  |  | 100 |  |  | — |
| PA-4 |  |  |  |  |  |  | — |
| PA-5 |  |  |  |  |  |  | 100 |
| LC-1 | 3 | 2 | 4 | 3 |  |  | — |
| LC-2 |  |  |  |  | 3 |  |  |
| TDI-1 | 1.5 | 1.8 | 1.5 | 1.5 | 1.5 | 1.5 | — |
| Durability | ○ | ○ | ○ | ○ | ○ | ○ | X |
| Light leakage measured by the method A | ○ | Δ–○ | ○ | ○ | ○ | X | ○ |
| Cuttability | ○ | ○ | ○ | ○ | ○ | ○ | X |

TABLE 3

| Composition And Properties | Example 6 | Example 7 | Example 8 | Example 9 | Example 10 | Comparative Example 3 |
|---|---|---|---|---|---|---|
| 50% polymer solution PA-1 | 100 | 100 | 100 | 100 | 100 | 100 |
| LC-1 | 6 | 12 |  |  |  |  |
| LC-2 |  |  | 12 |  |  |  |
| C-1 |  |  |  | 9 |  | 18 |
| C-2 |  |  |  |  | 7 |  |
| TDI-1 | 1.5 | 1.5 | 1.5 | 1.5 | 1.5 | 1.5 |
| Durability | ○ | ○ | ○ | ○ | ○ | X |
| Light leakage measured "B" | ○ | ○ | ○ | ○ | ○ | X (Phase separation) |
| Cuttability | ○ | ○ | ○ | ○ | ○ | Δ |

As shown above, the acrylic PSA composition of the present invention can improve the light leakage problem that occurs from the stress build-up during the durability test without sacrificing the polarizer durability and cuttability by using the birefringence compensation capability of PSA layer.

The present invention relates to acryl-based PSA composition comprising elements with positive stress optical coefficients and a polarizer using the same, that can prevent light leaking from a liquid crystal display panel due to stress resulting from the polarizer shrinkage.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An acrylic pressure sensitive adhesive (PSA) composition for a polarizer comprising a component having a positive stress optical coefficient, wherein the component having a positive stress optical coefficient is an aromatic compound represented by formula 1:

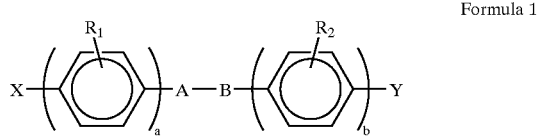

Formula 1 wherein

X and Y, and $R_1$ and $R_2$ are substituted groups selected from $C_1$~$C_{20}$ alkyl, $C_1$~$C_{20}$ alkoxy, $C_6$~$C_{20}$ aryl, hydrogen, cyano, chloride, bromide, hydroxy, dimethyl amine, or cumyl;

A—B is —CH=N—, —N=N—, —N=N(O)—, —COO—, —CH$_2$O—, —C(R$_1$)CO—, —COO—CH$_2$—, —C=C—, —C≡C—, —S—, —SO$_2$—, -Φ(R$_1$)—, —CH=N-Φ(R$_1$)—N=CH—, —C=C-Φ(R$_1$)—N=C—, —C=C-Φ(R$_1$)—C=C—, —C=C—Φ(R$_1$) -Φ(R$_2$) —C=C—, —C=N-Φ(R$_1$) -Φ(R$_2$)—N=C—, —C=N-Φ(R$_1$)-Φ(R$_2$)—C=C— that act as cores, or a core of naphthalene or anthracene, or A—B can be eliminated for direct connection;

wherein when a is an integer of 1 to 3, b is an integer of 0 to 3; and when a is 0, b is an integer of 1 to 3.

2. The acrylic PSA composition according to claim 1, wherein the composition comprises:

(a) 100 parts by weight of an acrylic copolymer forming a cross-linking structure; and (b) 0.01 to 30 parts by weight of the component having a positive stress optical coefficient.

3. The acrylic PSA composition according to claim 1, wherein the component having a positive stress optical coefficient has an asymmetric molecular structure in the direction of a long axis.

4. The acrylic PSA composition according to claim 3, wherein the molecular weight of the component having a positive stress optical coefficient is equal to or less than 2,000.

5. The acrylic PSA composition according to claim 1, wherein the aromatic compound is selected from a group consisting of biphenyl, trans-stilbene, azobenzene, p-terphenyl, m-terphenyl, cumylphenylbenzoate, diphenylacetylene, 4-ethylbiphenyl, 4'-pentyl-4-biphenyl carbonitrile, 4-biphenylcarbonitrile, 4'-pentylbiphenyl, 4'-pentoxy-4-biphenylcarbonitrile, 4'-hexyl-4-biphenylcarbonitrile, 4'-octyl-4-biphenyl carbonitrile, trans-4-octyl-4'-ethoxystilbene, naphthalene, anthracene, 4'-methoxybenzylideneaminostilbene, 4'-methoxybenzylideneaminoazobenzene, and a mixture thereof.

6. The acrylic PSA composition according to claim 2, wherein the acrylic PSA composition further comprises c) 0.01 to 10 parts by weight of a multi-functional cross-linking compound based on 100 parts by weight of the acrylic copolymer.

7. The acrylic PSA composition according to claim 1, wherein the crosslinking density of the acrylic adhesive composition ranges from 1 to 95%.

8. A polarizer comprising a PSA layer that is formed on either surface of the polarizer, wherein the PSA layer comprises the acrylic PSA composition according to claim 1.

9. The polarizer according to claim 8, wherein the polarizer has a protection film with a positive stress optical coefficient.

10. The polarizer according to claim 9, wherein the polarizer protection film comprises triacetyl cellulose.

11. The polarizer according to claim 8, wherein the polarizer further comprises at least one selected from the group consisting of retardation films, films for wide viewing angle, and films for brightness enhancement.

* * * * *